United States Patent

De Meulenaere

[15] 3,681,535

[45] Aug. 1, 1972

[54] SETTABLE AUTOMATIC CALL REPERTORY DEVICE WITH CONTROL OF DIAL, PUSHBUTTONS AND DATA MEMORIES

[72] Inventor: Robert O. De Meulenaere, 42 W. 58th St, New York, N.Y. 10019

[22] Filed: March 17, 1971

[21] Appl. No.: 125,227

Related U.S. Application Data

[63] Continuation-in-part of Ser. No. 801,212, Feb. 20, 1969.

[52] U.S. Cl. ..............................................179/90 B
[51] Int. Cl. ...............................................H04m 1/45
[58] Field of Search ...............179/90 B, 90 AD, 90 R

[56] References Cited

UNITED STATES PATENTS

| | | | |
|---|---|---|---|
| 2,502,517 | 4/1950 | Goldberger | 179/90 B |
| 3,604,856 | 9/1971 | Martin | 179/90 B |

*Primary Examiner*—Kathleen H. Claffy
*Assistant Examiner*—Thomas D'Amico

[57] ABSTRACT

This invention relates to automatic call repertory device which utilizes a settable disc memory to store the telephone numbers. The repertory device is arranged to operate either with a dial pulse transmitting mechanism or with an electronic key pulse transmitting means.

8 Claims, 7 Drawing Figures

PATENTED AUG 1 1972 3,681,535

SHEET 1 OF 5

INVENTOR
Robert O. DeMeulenaere

Robert O. De Meulenaere

SETTABLE AUTOMATIC CALL REPERTORY DEVICE WITH CONTROL OF DIAL, PUSHBUTTONS AND DATA MEMORIES

This application is a continuation-in-part of application Ser. No. 801,212 filed on Feb. 20, 1969.

FIELD OF THE INVENTION

This invention relates to a settable automatic call repertory device which permits to place calls to a number of predetermined parties by merely operating a single key for each call.

BACKGROUND OF THE INVENTION

Subscriber telephone sets for use with automatic telephone switching equipment, as is well known, in addition to a handset comprise a manually operable dial plate or keyboard which, after the handset has been removed and dial tone has been received, must be manually actuated by the user a plurality of times in succession to place a call to a desired party. Such a manual operation of the dial plate or keyboard is not only time consuming but also tedious if it must be performed frequently.

Automatic call repertory devices are well known in the art for relieving the user from dialing the repertory number of one or several parties to which he has to frequently place many calls. Said repertory devices are used together with a subscriber telephone set and permit to store a number of repertory numbers and to place calls on the subscriber lines associated to said stored repertory numbers by actuating one key or button only.

The prior art devices of this type are complex, relatively large in size and expensive to fabricate and all are arranged to operate with repertory numbers having a predetermined number of digits. Such devices have an operating time that is the time required to dial the maximum number of digits which the devices are adapted for. Say, for instance, this number is 23. In the event the number or digits to be dialed is less than this maximum number, say 10 for instance, a portion or even a major portion of the operating time can be lost. In such cases the automatic call repertory device is time consuming as it seizes the line circuitry during unused time periods, since a new sequence of digits can only be initiated when the device has completed its operating cycle. It is therefore not economically suitable for being used with data processing equipment.

In addition, when the user has operated a wrong button or when he changes his mind after having depressed a button, the devices known in the art remain unavailable for a new call until the full operation time period has elapsed. The larger the registration capacity the greater the unavailability period.

SUMMARY OF THE INVENTION

The object of the invention is to provide an automatic call repertory device that is settable such that the operating time has a duration not exceeding that one which is required for dialing the number of digits that are contained in the repertory number of the called party.

The device is arranged to stop operate when the last digit of the repertory number of the called party has been dialed even when this number is less than the maximum number of digits that the device is capable to store.

Another object of the invention is to provide an automatic call repertory device which is arranged to enable the user to stop the current dialing procedure at any time and to place a new call without having to wait that all the digits of the previous repertory number are sensed.

Yet another object of the invention is to provide an automatic call repertory device which is arranged to operate either with a dial pulse transmitting mechanism or an electronic key pulse transmitting means.

Another object of the invention is to provide an automatic call repertory device which not only is relatively simple in structure and operation, but also is simple and inexpensive to manufacture, and which, in addition, can be easily set up or changed by an unskilled operator.

Yet another object of the invention is to provide an automatic call repertory device which can readily be used with data processing equipment.

Yet another object of the invention is to provide an automatic call repertory device wherein the register presetting and the storage are located in the user's device itself, thereby assuring secrecy.

DESCRIPTION OF THE DRAWINGS

FIG. 7 is a schematic drawing of the energizing circuitry for the electric motor driving the automatic device.

GENERAL DESCRIPTION OF AN EMBODIMENT

Figure 1:
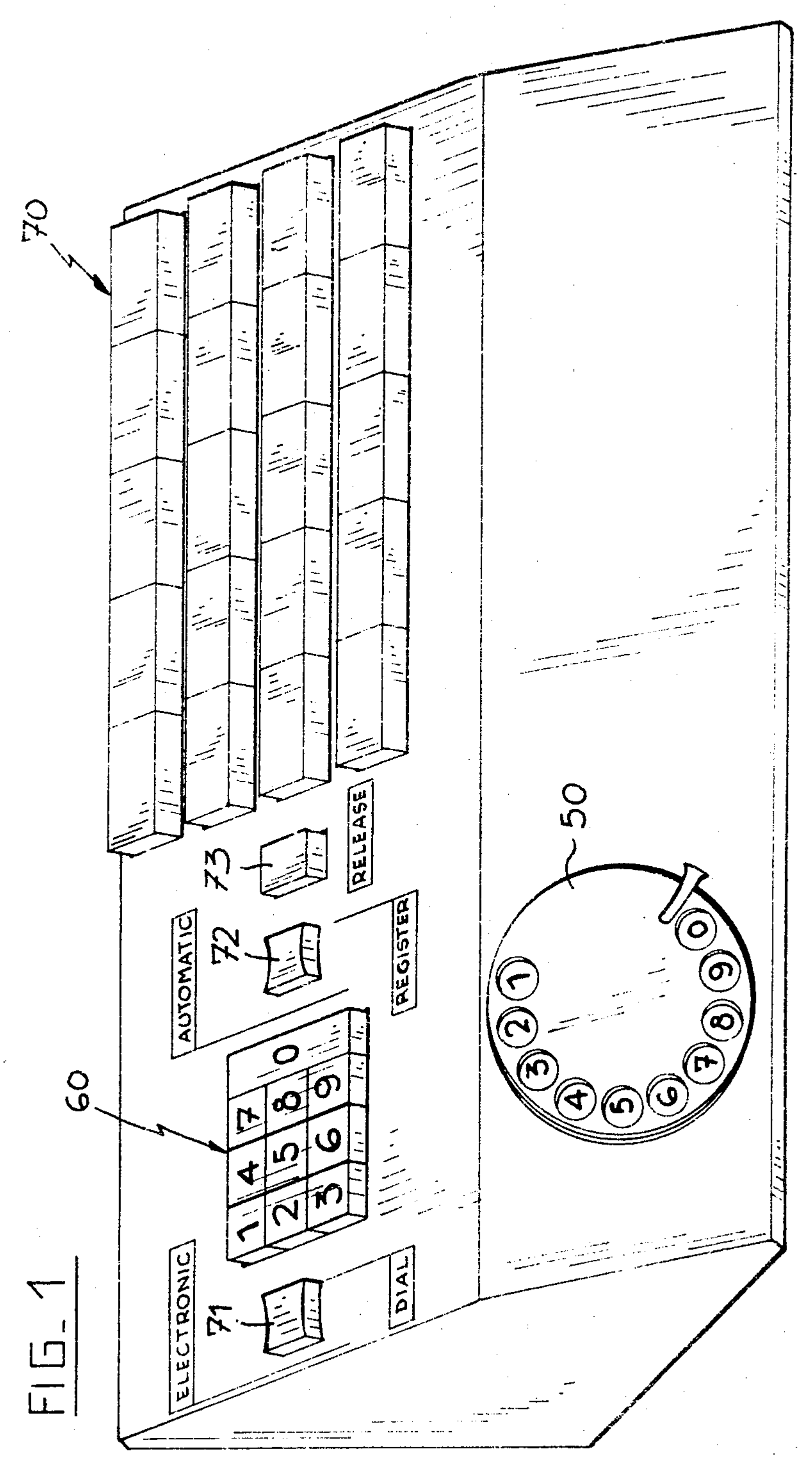
FIG. 1 is a perspective view of one embodiment of the invention.

Referring to FIG. 1, there is represented one embodiment of the invention automatic call repertory device for use both with conventional switching equipment and electronic switching equipment. This device is connectable to a usual telephone line. The dial plate 50 serves to form in the usual manner the digits of the repertory numbers which are intended to be stored as will be described hereinafter. The conventional mechanism associated to the dial plate serves to have the stored repertory numbers sent on the telephone line in case of connection to a conventional switching equipment. When the device is used with an electronic switching equipment, the stored repertory numbers are sent by means of the electronic keysender associated to keyboard 60. The dial plate 50 and keyboard 60 also permit the user to place ordinary direct calls on the telephone line. Lever 71 serves to prepare the device for dial selection or electronic selection.

The keyboard 70 is used to select the stored repertory number of the desired called party and to initiate the automatic procedure as will be described hereinafter. Each manually depressible key is associated to one distinct repertory number. Obviously, the number of keys is indifferent as well as their arrangement.

Lever 72 serves to select the registering or automatic dialing procedure. Release button 73 serves, according to an avantageous particular feature of the invention, to immediately release the current automatic dialing procedure.

The device illustrated in FIG. 1 also comprises means (not shown) for sending and/or receiving the messages transmitted on the line after the dialing procedure (either automatic or manual) and usual switching selection has takers place. When used for voice frequency and talk communications, for instance, the device can be provided with a conventional microtelephone handset.

Figure 2:
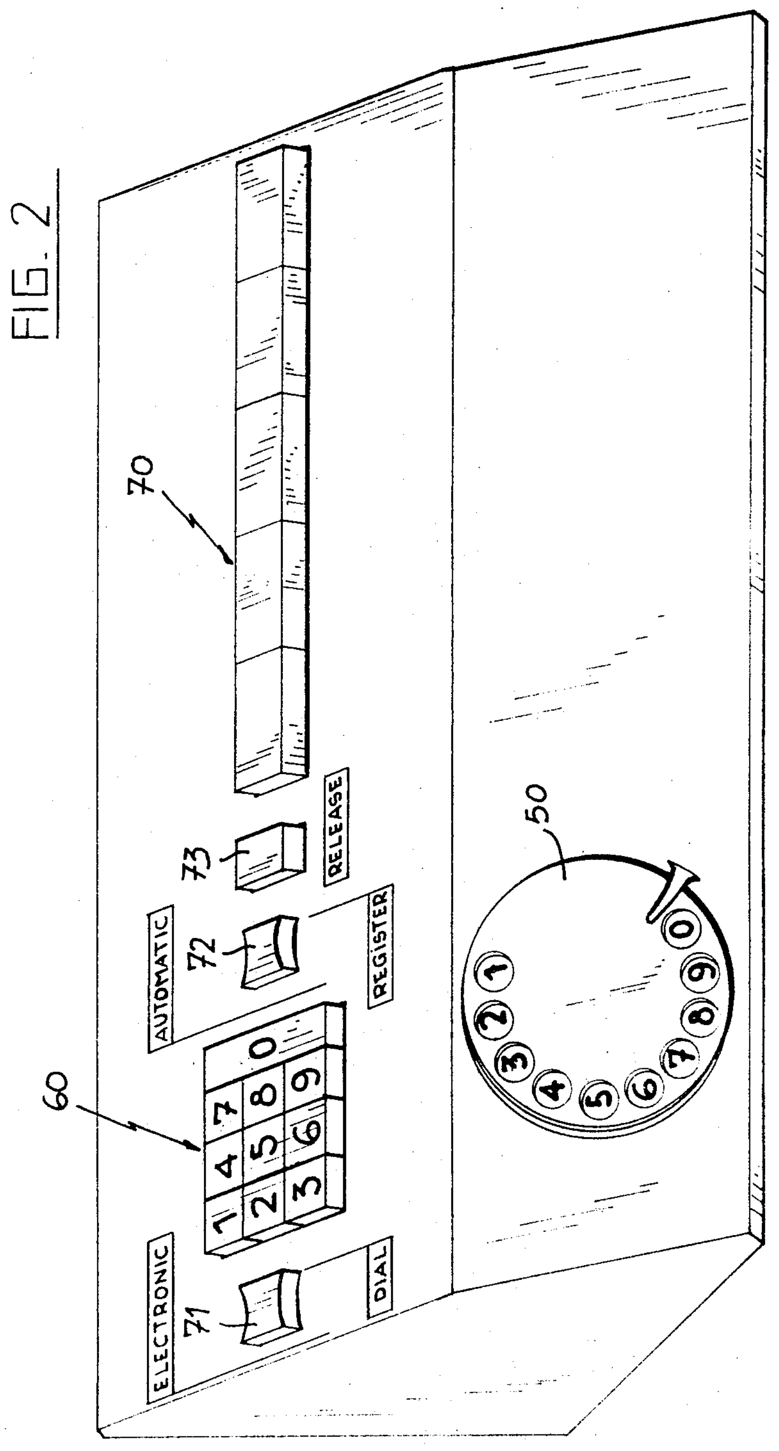
FIG. 2 is a perspective view of another embodiment of the invention.

FIG. 2 represents another embodiment of the automatic call repertory device of FIG. 1. This embodiment only differs from that shown in FIG. 1 by keyboard 70 having one row of keys only. The simplified embodiment will be described in detail with particular reference to FIG. 4.

The automatic call repertory device can also be used together with a usual subscriber telephone set. In this instance, the dialing mechanism associated to dial plate 50 and/or keyboard 60 will be operatively cooperating with the respective mechanism in the subscriber telephone set.

Figures 4, 5:
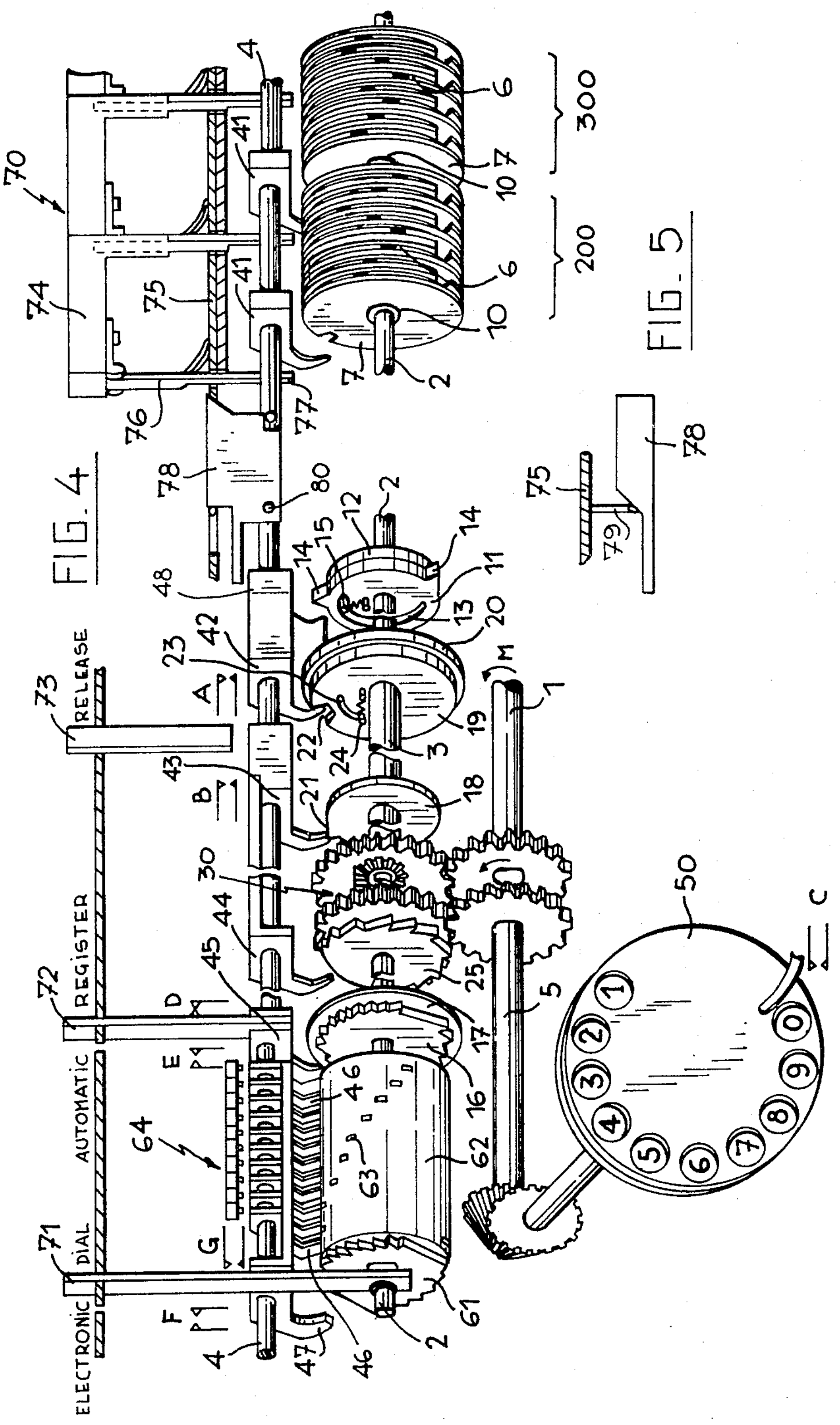
FIG. 4 is a schematic perspective view of the mechanism located inside of the apparatus of FIG. 2.
FIG. 5 is a top view of the specific detail arranged for actuating the control shaft in the embodiment of FIG. 4.
Figure 6:
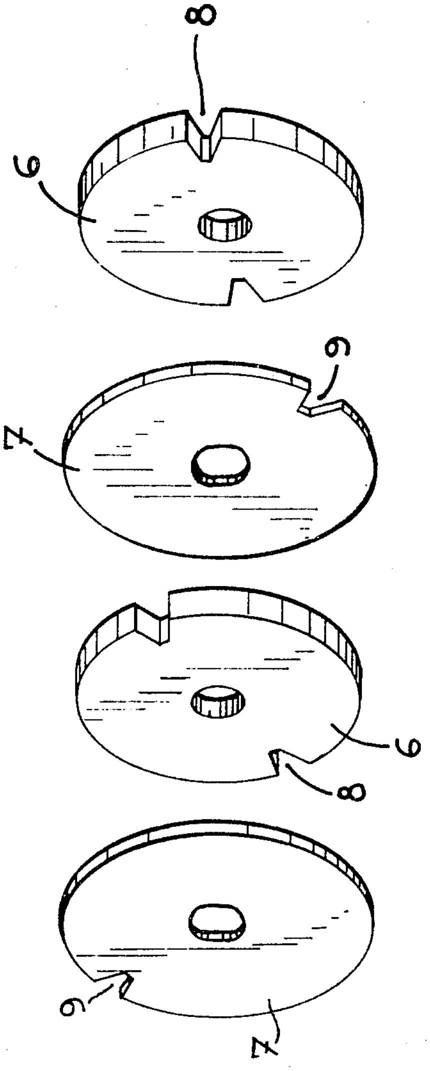
FIG. 6 is an exploded perspective view of the arrangement of the group of discs in a memory section according to the invention.
Figure 6:
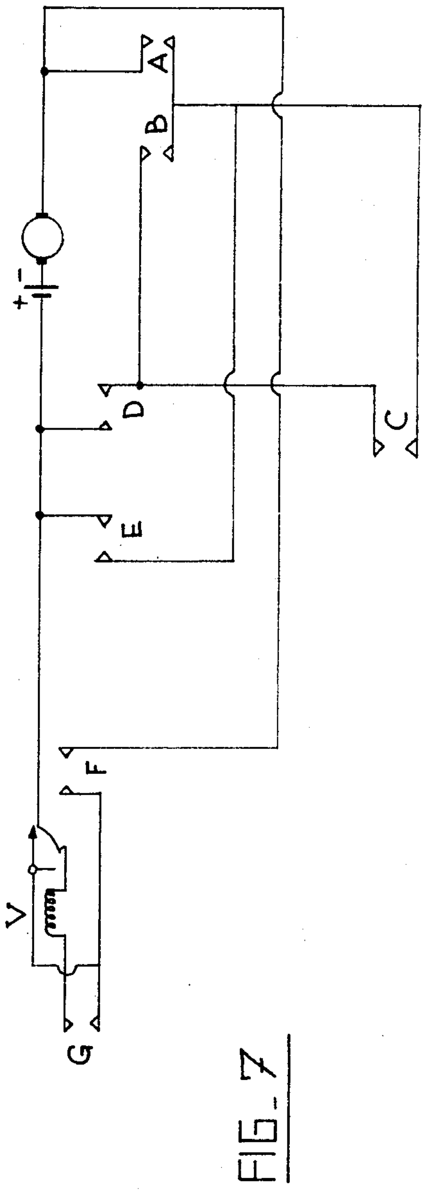

The mechanism as illustrated in FIG. 4 essentially comprises movable parts mounted on five rotatable shafts 1, 2, 3, 4 and 5. Shaft 1 is driven by an electric motor (not shown) and is rotatable in the direction of arrow M. Shaft 2 supports the memory for registering a number of repertory numbers. Each repertory number is registered in a memory section such as 200, 300. Each memory section, as shown more clearly in the exploded view of FIG. 6, comprises a group of discs including memory discs 6 and separation discs 7 in interleaved relationship. The memory discs 6 are mounted free on shaft 2 and are provided with two diametrically opposed notches 8 in the periphery thereof. The separation discs 7 have a greater diameter than memory discs 6 and are mounted on shaft 2 such that they rotate therewith but they are not mounted fast on shaft 2. Separation discs 7 are provided with a single notch 9 in the periphery thereof. The notches of the consecutive separation discs are 180° shifted from each other. Said discs are laterally displaceable on shaft 2 so as to transmit lateral pressure to the other discs of the section group, the amount of said pressure being determined by the distance between two end discs (10) mounted fast on shaft 2 which compress the interleaved discs 6 and 7 of the group. The number of memory discs 6 is unlimited and is chosen to correspond to the maximum number of digits which are expected to be contained in the repertory numbers to be registered. By digit is meant herein not only digital information but alphanumerical information as well. By repertory number is meant herein not only the specific repertory number as used usually in telephone service but also any data format as used in data processing systems.

Also mounted on shaft 2 are so-called cycle planning cam means 11–12. Cam 11 is mounted free on shaft 2 with a slot 13 therein. Cam 11 is provided with two projections 14 as will be described hereinafter. Companion wheel 12 is mounted fast on shaft 2 and serves to drive cam 11 through pin 15 that is guided in slot 13, said pin 15 being elastically connected to cam 11. Shaft 2 also supports a ratchet stop wheel 16 mounted fast on shaft with a companion wheel 17.

Figure 3:
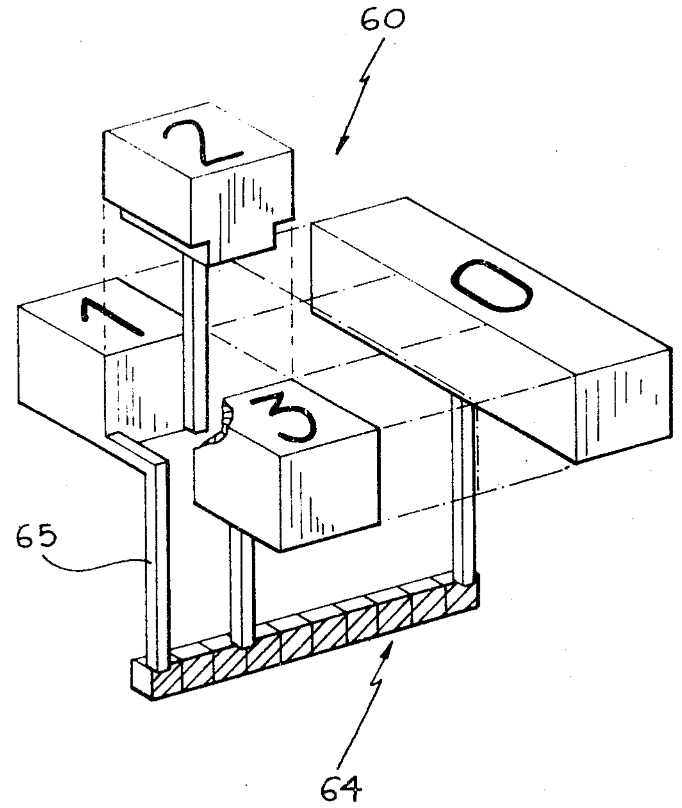
FIG. 3 is a perspective view of an embodiment of keyboard arrangement for actuating an electronic keysender.

For being used with an electronic keysender as illustrated, there is provided, rotatively solid with memory shaft 2, a second ratchet stop wheel 61 and cylindrical cam 62, both slidably mounted on shaft. Stop wheel 61 is designed with a profile which is reverse to that of stop wheel 16. Cam 62 has a number of pairs of notches 63 therein, the notches of each pair being diametrically opposed to each other. The number of pairs is equal to the number of data to be sent in a format. In the illustrative embodiment, said number of pairs is equal to the number of finger positions in dial plate 50. Each pair of notches 63 are operatively associated with a corresponding number of pawl control members mounted free on control shaft 4, each of said control members being adapted to actuate a respective key of an electronic keysender 64 which is associated with keyboard 60 as shown more specifically in FIG. 3. Each key on keyboard 60 is provided with a shank 65 adapted to cooperate with one key on keysender 64.

Shaft 3 is mounted as a sleeve to memory shaft 2. It is solid with a gear means system 30 drivingly connected with motor shaft 1, and a switching cam means comprised of cams 18, 19 and 20.

Cam 18 is mounted fast on shaft 3 and has a projection 21 thereon. Cam 19 is mounted fast on shaft 3 and has a notch 22 the angular position of which corresponds to that of projection 21 on cam 18. Cam 19 is provided with a slot 23. Cam 20 is similar to cam 19 but it is somewhat larger in diameter and has a pin 24 instead of slot 23. Said pin 24 is guided in slot 23 and is elastically connected to cam 19.

Shaft 4 is the control shaft supporting a number of pawl control members which are either mounted such that they rotate with shaft 4 or mounted free thereon. There is one pawl 41 for cooperating with each distinct group of discs on memory shaft 2. Pawl 42 is arranged to cooperate with cycle planning cam 11 and switching cams 19 and 20. Pawl 43 is arranged to cooperate with lifting cam 18. Pawl 44 is arranged to cooperate with a wheel 25 mounted solid with gear means system 30. Pawl 45 is arranged to cooperate with stop wheel 16. Pawls 46 are arranged to cooperate with the respective pairs of notches in cam 62. Pawl 47 is arranged to cooperate with stop wheel 61.

Shaft 5 is operatively coupled with dial plate 50 which enables the user to dial the digits of the repertory numbers to be registered. Said shaft 5 is also drivingly connected to said gear means system 30.

The device also comprises a manually controlled keyboard 70 comprising as many keys as there are repertory numbers that are intended to be registered. Each key is associated with one group of discs such as 200, 300. Each key is operatively connected to one pawl 41. There are also provided levers 71, 72 and a release button 73, the function of which will be described hereinafter. There are also provided a number of switches A-G which are inserted in the energizing circuitry (represented in FIG. 7) of the electric motor and which are operated as will be apparent from the description to follow.

In the illustrative embodiment described herein, the disc memory sections such as 200 and 300 are shown mounted on one memory shaft 2. It is to be understood that the memory sections, the number of which is irrelevant, may be mounted on a plurality of shafts rotatively solid with each other. In this case, the manually controlled keyboard comprises keys arranged in rows, each row being associated with one of said memory shafts. Obviously, one or more control shafts 4 may be arranged to be operatively connectable to said plurality of memory shafts. In such an embodiment, the cycle planning cam means 11–12 and wheels 16–17 may be mounted on one of said shafts while arranging shafts 1, 3 and 5 to be drivingly connected with one of said memory shafts. The arrangement for using the device with an electronic pulse transmitting means too may be associated to one of said memory shafts.

The essential feature of the invention results from the arrangement of the discs in each memory section and the cycle planning cam means 11–12. It has been seen above that cam 11 is provided with two projections. According to the invention, the angular position of one or both of said projections 14 is shifted in the rotation direction with respect to the angular position of notch 22 in switching cam 19. Said angular advance of projection 14 is less than half the angular deviation of dial plate 50 between digit 1 position and the usual fingerstop. As can be seen in FIG. 4, cam 11 and cams 19–20 are operatively coupled with pawl 42 which is mounted free on control shaft 4. During rotation of memory shaft 2, when driven by motor, projection 14 on cam 11 is passing under pawl 42 which is still lifted by cam 20, i.e. slightly prior to engagement of said pawl 42 into notch 22 in cam 19. In this way, switch A can only be operated when a next digit is still to be dialed by complete return of dial plate.

Having described the mechanical arrangement it will now be described the operation thereof.

DETAILED DESCRIPTION OF THE OPERATION

Presetting

If the repertory device is used with a dial mechanism, lever 71 is placed in position DIAL and lever 72 is placed in position REGISTER. To register a repertory number, the user depresses a key on keyboard 70 in order to select a memory section for registering the said repertory number. Depression of button 74, which is associated to memory section 200, for instance, causes slider 75 to be pushed rightwards through suitable coupling means such as cam 76, thereby causing the respective pawl 41 to be shifted rightwards through pin 77. Concurrently shaft 4 is caused to rotate through means such as articulation member 78 that is moved towards the onlooker by pin 79 integral with slider 75 as is apparent in FIG. 5. The pawls on shaft 4 are thereby lifted and they remain lifted until slider 75 has completely moved to the right with full depression of the selected key. When the depressed key releases under its spring action, slider 75 moves back and articulation member 78 is caused to rotate about pin 80 solid with shaft 4, thereby acting upon shank 48 of pawl 42. This is lifted and it is held in lifted position by released masking cam 20. When lifted, pawl 42 closes switch A.

With lever 72 in position REGISTER, pawl 45 is elastically urged to the right over wheel 17. Furthermore, switch D is operated, thereby connecting switches B and C in series with switch A. The user then dials the first digit of the repertory number to be registered. If by instance the repertory number to be registered is the seven digit number 7533500, the first digit to dial is the digit 7. When the user's finger while forming the first digit 7 reaches the dial plate's fingerstop, switch C is operated, thereby causing the motor to be energized. During motor rotation, switch B is held operated by pawl 43 in plunged condition as long as shaft 3 which is drivingly connected to motor shaft 1, completes its revolution. Return of dial plate 50 is stopped by pawl 44 that engages wheel 25. The extended arm of pawl 44 causes pawl 43 to plunge until lifting cam 18 eventually lifts it, thereby disengaging pawl 44 and allowing dial plate 50 to return.

During the rotation period of the motor and while dial is held standing, memory shaft 2 is rotated half a revolution under the action of motor through gear means system 30. A notch in first memory disc 6 of group 200 is thus positioned under pawl 41 now lifted above memory disc's periphery as a result of the lifting of pawl 43. The notch is thus correctly set between the go and return rotations of dial plate 50.

At the end of the dial plate return, memory shaft 2 which had been rotated by 180° under the action of the electric motor, will present the escape hole in the first separation disc to pawl 41 which then moves leftwards under its spring action against a second separation disc 7 and above a second memory disc 6 whereon the second digit 5 of the repertory number 7533500 will be registered.

When all digits are dialed, lever 72 is placed in position AUTOMATIC, causing pawl 45 to be urged leftwards. Lever 72 also releases switches B and C. Memory shaft 2 now can only be stopped by the cycle planning cam 11 which will stop the whole device after one rotation without dialing. Said rotation of memory shaft 2 sets notch in the eight memory disc 6 in line with escape hole in separation disc 7, thereby determining an end-of-dialing condition. The device then stops since pawl 42 is engaging notch 22 in switching cam 19 in its home position and consequently switch A is not operated.

If group 200 has by instance enough discs to store numbers of up to 23 digits, when storing the seven digit number 7533500 the device stops immediately when after dialing one puts lever 72 on AUTOMATIC, the remaining sixteen settable discs of group 200 having not to be set after the eight memory disc has been set in unoperative position for cooperation with cycle planning cam 11 during automatic call.

When the repertory device is used with an electronic keysender, the operation is exactly the same as described above. When registering is completed, lever 71 is placed in position ELECTRONIC instead of being left in position DIAL.

Automatic call

To place a call to a party whose repertory number is registered in the device as explained above, lever 72 is set in position AUTOMATIC, thereby elastically urging pawl 45 leftwards. When the device is used with a dial mechanism, lever 71 is set in position DIAL. To send the repertory number, by instance number 7533500 the key 74 on keyboard 70 which corresponds to the repertory number to dial will simply be depressed, causing shaft 4 to rotate as described above for the presetting procedure. Pawl 41 corresponding to the selected key 74 is pushed rightwards, moving above the memory discs of group 200 until it falls to the right thereof below the periphery of separation discs 7 but above the periphery of the memory discs 6. When the selected key 74 releases under it spring action, slider 75 moves back leftwards, thereby to cause pawl 42 to be lifted as described above. Meanwhile pawl 45 has been lifted too and is allowed to jump leftwards over wheel 17. In this manner pawl 45 is set in front of teeth on stop wheel 16.

With contact A operated, the motor causes switching cam 19 to rotate, allowing pawl 43 to plunge. Memory shaft 2 then rotates first since it is not opposed by a spring action, said rotation following up to the position where pawl 41 engages a notch in the rightmost memory disk of the corresponding memory section. Pawl 41 that tends to move leftwards under spring action is stopped at the right side of the rightmost separation disc which has its single escape hole diametrically opposed to the starting position. It will be recalled that the escape holes in the consecutive separation discs are alternately disposed diametrically opposite to each other. Pawl 41 thus engages a notch in first memory disc 6, thereby causing pawl 45 to engage a tooth in stop wheel 16. Memory shaft 2 stops to rotate and dial plate 50 is now driven into rotation under the action of motor M through shaft 1 and the gear means system 30. The digit 7 corresponding to the notch position in the first memory disc is thus dialed during the remaining part of the full rotation period of the motor. Rotation of dial plate 50 causes the registered digit 7 to be dialed. The full rotation period of the motor corresponds to one full revolution of switching cam 19 and at the end thereof, pawl 42 engages notch 22 under spring action, said notch having been unmasked by cam 20 just prior to the end of one revolution of cam 19. Should a notch have not been encountered during one rotation period of the motor, then would memory shaft have made half a revolution. After one period of rotation, the pawls thus are lifted by lifting cam 18 above the periphery of the memory discs. During the return rotation of dial plate, memory shaft 2 is caused to rotate further such as to complete one half revolution, thereby to present the escape hole in the first separation disc 7 in front of pawl 41. As a result, pawl 41 is allowed to move leftwards up to against the second separation disc 7.

When dial plate 50 returns to its rest position after transmission of the first digit as described above, memory shaft 2 completes its half revolution, driving cams 12 and 11 so as to lift pawl 42, thereby to close switch A for enabling transmission of the next digit 5. The procedure described above then repeats for each of the other digits of the registered repertory number 7533500. When the last digit thereof has been dialed, pawl 41 does engage no more notch in the eight memory disc during one half revolution of memory shaft 2 and motor stops since switch A is released as a result of the advanced angular position of projection 14 on cam 11 with respect to the position of notch 22 in cam 19. This function of cam 11 explains why it is called a cycle planning cam: it shapes the operation cycle according to the number of digits contained in the registered repertory number 7533500 associated to the selected key 74 on keyboard 70.

The cycle planning cam 11 not only permits to shape the operation cycle according to the number of digits to be automatically dialed as explained hereabove, but it also permits to stop at will the operation of the mechanism. Should the user have depressed a wrong key or should he change his mind, after having depressed a key on keyboard 70, he merely depresses release button 73. This causes pawl 43 and all pawls 41 on shaft 3 to be lifted so that no digits are dialed any more. The device then immediately stops to operate as explained above and is immediately made available for another call without the user has to wait that all the remaining digits have been dialed.

When the repertory device is used with an electronic keysender, lever 72 is set in position AUTOMATIC as with a dial mechanism, and lever 71 is set in position ELECTRONIC, thereby operating switch F. Wheel 61 is moved laterally by the operation of lever 71, so that pawl 47 now faces the teeth in ratched wheel 61. Lifting of pawl 47 will cause pawl 45 to be lifted before its reaching a tooth in stop wheel 16 whereas pawl 41 moves out of notch in the memory disc before displacement thereof. As seen above, when no dialing occurs, cam 11 does not operate switch A and the motor does not drive the mechanism. A further rotation by 180° of memory shaft 2 has therefore to be assured by operation of switch G which is operated by pawl 47. Said switch energizes a suitable electro-magnet V, represented in FIG. 7, each time pawl 47 plunges. This occurs each time pawl 41 engages a memory notch. One pawl 46 then engages a notch 63 in cam 62 and so doing its shank actuates the corresponding key of keysender 64.

When all digits have been sent, no memory notch is engaged in the next memory disc in time for pawl 47 to plunge and energize the motor. The device then stops as described above.

By instance, lever 71 being on electronic, lever 72 on automatic, to call automatically by electronic dialling the number 7533500 registered on button 74 of the automatic repertory 70, instead of pressing successively the electronic buttons of of keyboard 60, corresponding to each of the seven digits of that number, simply press button 74 of automatic keyboard 70 and the seven pressings on electronic keysender 64 will be done automatically, each pressing on the key of keysender 64 corresponding to the position on memory shaft of the notch of each memory disc of group 200. The first pressing is done on key of keysender 64 corresponding to first digit 7 of number 7533500, as memory notch of first memory disc of group 200 is penetrated by feeler 41 after a rotation of memory shaft 2 bringing a notch 63 of cam 62 only under shank of feeler 46 of the key of keysender 64 corresponding to digit 7, first digit of number 7533500.

After automatic electronic dialling of all seven digits, when during the exploration by feeler 41 of the eight memory disc of group 200 rotating with memory shaft 2, disc who is in an unoperative position, no memory notch is met and therefore switch G is not operated by pawl 47, neither switch A by cycle planning cam 11, the device is not restarted so that it stops immediately after the electronic dialling of number 7533500.

Ordinary Calls

The device can also be used for sending ordinary calls. The repertory number of the called party is formed either by means of dial plate 50 as conventional or by means of keyboard 60 (see on FIGS. 1, 2 and 3) according to the type of telephone system to which it is associated.

When it is used with a dial type system, lever 71 is set in position DIAL and lever 72 is set in position AUTOMATIC. The dial 50 is used as usually. Shaft 1 is at rest and lifting cam 18 is in rest position (shown on the drawing), thereby to hold the pawls on control shaft 4 in a lifted condition. Memory shaft 2 turns freely with the dial plate.

When the device is used with an electronic system, lever 71 is set in position ELECTRONIC and lever 72 is set in position AUTOMATIC. The dial is not used, but keyboard 60 operatively associated to keysender 64 is used instead.

It will be apparent that many modifications and variations may be effected by those skilled in the art without departing from the scope and spirit of this invention.

What is claimed is:

1. An automatic call repertory device comprising a first rotatable shaft, an electric motor drivingly connected with said shaft, a plurality of second shafts rotatively solid with each other, each having mounted thereon a plurality of spaced groups of frictionly urged discs, each group including a number of alternate memory discs and separation discs, each memory disc having two diametrically opposed notches in the periphery thereof and each separation disc having a single notch in the periphery thereof, the notches in consecutive ones of said separation discs being 180° shifted with respect to each other, a third rotatable shaft drivingly connected with said first shaft, a plurality of fourth shafts rotatively solid with each other, each having a number of pawl control members thereon, a fifth rotatable shaft drivingly connected with said third shaft, dial means drivingly connected to said fifth shaft and having a stop means associated thereto, a plurality of manually depressible keys each being associated to one of said groups of discs and operatively connectable to a respective pawl control member, electric switch means inserted in the energizing circuitry of said electric motor, first cam means mounted on said third shaft, said cam means having associated thereto switching means operatively connectable to pawl control member, second cam means mounted on one of said plurality of second shafts and having associated thereto switching means operatively connectable to pawl control member and which is angularly shifted in the rotation direction of said second shaft with respect to said switching means associated to first cam means, the said angular shift being less than half the angular deviation of said dial means between the digit one position and said stop means thereof, thereby to disable said electric switch means such that the electric motor is disenergized and the device stopped to rotate when that one of said pawl control members which is associated to the selected key does not engage a notch in any of said memory discs during one half revolution of said second shafts.

2. The automatic call repertory device of claim 1, wherein there is further provided manual control means adapted to cause said pawl control members to be lifted, thereby to release the device after completion of the current revolution of said first cam means while maintaining the pawl control member associated to the selected key out of notch in that one of said memory discs it was engaging at the time the said control means has been operated.

3. The automatic call repertory device of claim 1, further comprising, rotatively solid with said second shafts, manually settable third cam means adapted to hold one of said pawl control members in a lifted position when it is set to unlock the mechanism, fourth cylindrical cam means having a number of pairs of diametrically opposed notches therein, said notches being arranged to be engaged by respective ones of said pawl control members on one of said fourth shafts, a row of electronic key means, the number of which is equal to the number of notch pairs in said fourth cam means, each of said respective pawl control members on said fourth shaft being arranged to operate a respective one of said electronic keys when it is caused to engage a notch in said fourth cam means.

4. The automatic call repertory device of claim 2, further comprising, rotatively solid with said second shafts, manually settable third cam means adapted to hold one of said pawl control members in a lifted position when it is set to unlock the mechanism, fourth cylindrical cam means having a number of pairs of diametrically opposed notches therein, said notches being arranged to be engaged by respective ones of said pawl control members on one of said fourth shafts, a row of electronic key means, the number of which is equal to the number of notch pairs in said fourth cam means, each of said respective pawl control members on said fourth shaft being arranged to operate of respective one of said electronic keys when it is caused to engage a notch in said fourth cam means.

5. An automatic call repertory device comprising a first rotatable shaft, an electric motor drivingly connected with said shaft, a second rotatable shaft having mounted thereon a plurality of spaced groups of frictionly urged discs, each group including a number of alternate memory discs and separation discs, each memory disc having two diametrically opposed notches in the periphery thereof and each separation disc having a single notch in the periphery thereof, the notches in consecutive ones of said separation discs being 180° shifted with respect to each other, a third rotatable shaft drivingly connected with said first shaft, a fourth rotatable shaft having a number of pawl control members thereon, a fifth rotatable shaft drivingly connected with said third shaft, dial means drivingly connected to said fifth shaft and having a stop means associated thereto, a plurality of manually depressible keys, each being associated to one of said groups of discs and operatively connectable to a respective pawl control member, electric switch means inserted in the energizing circuitry of said electric motor, first cam means mounted on said third shaft, said cam means having associated thereto switching means operatively connectable to pawl control member, second cam means mounted on said second shaft and having associated thereto switching means operatively connectable to pawl control member and which is angularly shifted in the rotation direction of said second shaft with respect to said switching means associated to first cam means, the said angular shift being less than half the angular deviation of said dial means between the digit one position and said stop means thereof, thereby to disable said electric switch means such that the electric motor is disenergized and the device stopped to rotate when that one of said pawl control members which is associated to the selected key does not engage a notch in any of said memory discs during one half revolution of said second shaft.

6. The automatic call repertory device of claim 5, wherein there is further provided manual control means adapted to cause said pawl control members to be lifted, thereby to release the device after completion of the current revolution of said first cam means while maintaining the pawl control member associated to the selected key out of notch in that one of said memory discs it was engaging at the time the said control means has been operated.

7. The automatic call repertory device of claim 5 further comprising, rotatively solid with said second shaft, manually settable third cam means adapted to hold one of said pawl control members in a lifted position when it is set to unlock the mechanism, fourth cylindrical cam means having a number of pairs of diametrically opposed notches therein, said notches being arranged to be engaged by respective ones of said pawl control members on said fourth shaft, a row of electronic key means, the number of which is equal to the number of notch pairs in said fourth cam means, each of said respective pawl control members on said fourth shaft being arranged to operate a respective one of said electronic keys when it is caused to engage a notch in said fourth cam means.

8. The automatic call repertory device of claim 6 further comprising, rotatively solid with said second shaft, manually settable third cam means adapted to hold one of said pawl control members in a lifted position when it is set to unlock the mechanism, fourth cylindrical cam means having a number of pairs of diametrically opposed notches therein, said notches being arranged to be engaged by respective ones of said pawl control members on said fourth shaft, a row of electronic key means, the number of which is equal to the number of notch pairs in said fourth cam means, each of said respective pawl control members on said fourth shaft being arranged to operate a respective one of said electronic keys when it is caused to engage a notch in said fourth cam means.

* * * * *